US008687125B2

United States Patent
Numao et al.

(10) Patent No.: US 8,687,125 B2
(45) Date of Patent: Apr. 1, 2014

(54) IMAGE PROCESSING SYSTEM AND DISPLAY DEVICE FOR CARRYING OUT SUBTRACTION OR ADDITION OF A PIXEL VALUE OF A TARGET PIXEL IN ACCORDANCE WITH A VALUE EQUIVALENT TO A NOISE QUANTITY

(75) Inventors: Takaji Numao, Osaka (JP); Seiichi Gohshi, Osaka (JP); Takashi Mine, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/643,149

(22) PCT Filed: Feb. 7, 2011

(86) PCT No.: PCT/JP2011/052548
§ 371 (c)(1),
(2), (4) Date: Oct. 24, 2012

(87) PCT Pub. No.: WO2011/145365
PCT Pub. Date: Nov. 24, 2011

(65) Prior Publication Data
US 2013/0057768 A1 Mar. 7, 2013

(30) Foreign Application Priority Data

May 18, 2010 (JP) ................................. 2010-114101

(51) Int. Cl.
*H04N 5/21* (2006.01)
*H04N 5/213* (2006.01)
(52) U.S. Cl.
USPC ............................. 348/616; 348/619; 348/620
(58) Field of Classification Search
USPC ......... 348/242, 246, 607, 615, 616, 618–620, 348/701; 382/260, 274, 275; 345/63, 611, 345/58
See application file for complete search history.

(56) References Cited

U.S. PATENT DOCUMENTS 6,195,132 B1 2/2001 Kimura et al.
6,347,161 B1 * 2/2002 Mancuso ...................... 382/261
(Continued)

FOREIGN PATENT DOCUMENTS

JP 07-250264 A 9/1995
JP 08-172368 A 7/1996
(Continued)

OTHER PUBLICATIONS

Official Communication issued in International Patent Application No. PCT/JP2011/052548, mailed on May 10, 2011.

(Continued)

*Primary Examiner* — Victor Kostak
(74) *Attorney, Agent, or Firm* — Keating & Bennett, LLP

(57) ABSTRACT

An image processing system for processing a target pixel to be processed, which target pixel corresponds to inputted image data, a plurality of pixels including the target pixel being arranged in a matrix manner, includes an NR circuit (106). The NR circuit (106) includes a signal processing process circuit (114) for carrying out subtraction or addition, with respect to a pixel value Aij of the target pixel, of a value equivalent to a noise quantity Er calculated in advance, in a case where the pixel value Aij of the target pixel is larger or smaller, respectively, than a first couple of estimated values Bij and Cij for the pixel value Aij of the target pixel, the first couple of estimated values Bij and Cij being estimated from pixel values of respective pixels adjacent to the target pixel, centered at the target pixel, in a temporal axis or in a spatial axis. It is therefore possible to provide an image processing system which further reduces noise and is less likely to blur a video as compared with a conventional noise reduction process.

7 Claims, 22 Drawing Sheets

(56) References Cited

U.S. PATENT DOCUMENTS

| | | | |
|---|---|---|---|
| 7,365,801 B2 * | 4/2008 | Kondo | 348/620 |
| 7,535,517 B2 * | 5/2009 | Zhou et al. | 348/701 |
| 7,769,089 B1 * | 8/2010 | Chou | 375/240.29 |
| 2003/0122967 A1 * | 7/2003 | Kondo et al. | 348/607 |
| 2006/0238650 A1 * | 10/2006 | Wredenhagen et al. | 348/452 |
| 2007/0018932 A1 | 1/2007 | Takaki et al. | |
| 2009/0219417 A1 * | 9/2009 | Tsuruoka | 348/241 |
| 2010/0188582 A1 * | 7/2010 | Hsu | 348/607 |

FOREIGN PATENT DOCUMENTS

| | | |
|---|---|---|
| JP | 09-163185 A | 6/1997 |
| JP | 10-084498 A | 3/1998 |
| JP | 10-248027 A | 9/1998 |
| JP | 2000-022992 A | 1/2000 |
| JP | 2006-191454 A | 7/2006 |
| JP | 2007-033659 A | 2/2007 |
| JP | 2008-205737 A | 9/2008 |
| JP | 2010-148015 A | 7/2010 |
| JP | 2010-148017 A | 7/2010 |
| JP | 2010-166349 A | 7/2010 |

OTHER PUBLICATIONS

Official Communication issued in International Patent Application No. PCT/JP2010/071731, mailed on Feb. 1, 2011.

Numao et al.; "Image Processing and Display Device"; U.S. Appl. No. 13/579,046, filed Aug. 15, 2012.

\* cited by examiner

FIG. 4

EXPRESSION (1)

```
Ers=0
Co=0 if Y(i-1, j)>Y(i, j) and Y(i, j)<Y(i+1, j)
    then Ers=Ers+(Y(i-1, j)+Y(i+1, j))/2-Y(i, j)
         Co=Co+1
    else if Y(i, j-1)>Y(i, j) and Y(i, j)<Y(i, j+1)
         then Ers=Ers+(Y(i, j-1)+Y(i, j+1))/2-Y(i, j)
              Co=Co+1
        else if Y(i-1, j)<Y(i, j) and Y(i, j)>Y(i+1, j)
             then Ers=Ers+Y(i, j)-(Y(i-1, j)+Y(i+1, j))/2
                  Co=Co+1
            else if Y(i, j-1)<Y(i, j) and Y(i, j)>Y(i, j+1)
                 then Ers=Ers+Y(i, j)-(Y(i, j-1)+Y(i, j+1))/2
                      Co=Co+1
                 end
            end
        end
end
Er=Ers/Co
```

FIG. 7

```
EXPRESSION (2)
Ers=0
Co=0 if Y(i-1, j-1)>Y(i, j) and Y(i, j)<Y(i+1, j+1)
    then Ers=Ers+(Y(i-1, j-1)+Y(i+1, j+1))/2-Y(i, j)
        Co=Co+1
    else if Y(i+1, j-1)>Y(i, j) and Y(i, j)<Y(i-1, j+1)
        then Ers=Ers+(Y(i+1, j-1)+Y(i-1, j+1))/2-Y(i, j)
            Co=Co+1
    else if Y(i-1, j-1)<Y(i, j) and Y(i, j)>Y(i+1, j-1)
        then Ers=Ers+Y(i, j)-(Y(i-1, j-1)+Y(i+1, j-1))/2
            Co=Co+1
    else if Y(i+1, j-1)<Y(i, j) and Y(i, j)>Y(i-1, j+1)
        then Ers=Ers+Y(i, j)-(Y(i+1, j-1)+Y(i-1, j+1))/2
            Co=Co+1
            end
        end
    end
end
Er=Ers/Co
```

```
EXPRESSION (3)

Ers=0;
Co=0;

for J=1:Ymax
for I=1:Xmax
    if bitand(%Pin(I,J)<%Din(I,J),%Din(I,J)>%Ain(I,J))
        Ers=Ers+(%Din(I,J)-(%Pin(I,J)+%Ain(I,J))/2);
        Co=Co+1;
    elseif bitand(%Pin(I,J)>%Din(I,J),%Din(I,J)<%Ain(I,J))
        Ers=Ers+((%Pin(I,J)+%Ain(I,J))/2-%Din(I,J));
        Co=Co+1;
    end
end
end
Er=Ers/Co;
```

IMAGE PROCESSING SYSTEM AND DISPLAY DEVICE FOR CARRYING OUT SUBTRACTION OR ADDITION OF A PIXEL VALUE OF A TARGET PIXEL IN ACCORDANCE WITH A VALUE EQUIVALENT TO A NOISE QUANTITY

TECHNICAL FIELD

The present invention relates to a technique of reducing noise by use of a digital image processing system, particularly relates to (i) a technique of reducing noise of moving images on, for example, a TV, (ii) an image processing system employing the technique, and (iii) a display device.

BACKGROUND ART

Analog broadcasting will finish in 2011 in Japan. Further, analog broadcasting will finish in other developed countries, and is being switched to digital broadcasting. Therefore, a replacement demand for a TV will increase in developed countries until around 2011.

It is, however, predicted that the replacement demand for a TV decreases in developed countries after 2012. Meanwhile, a demand for a TV has been expected to still rise in developing countries in Asia and in South America since 2012 because such developing countries keep a high economic growth rate. It is therefore considered that a TV market centers on the developing countries after 2012.

In the developing countries, however, broadcasting environment is poor. Therefore, in analog broadcasting, an electric field is weak, and video signals become noisy. Further, even in digital broadcasting, video signals become noisy because, frequently, a recorded analog video is converted into a digital video and rebroadcasted. On this account, a noise reducing technique is essential for TVs required in the developing countries.

An example of the noise reducing technique is a low-pass filter. The low-pass filter, however, has a problem of blurring a video while reducing noise.

In order to solve the problem, there has been proposed using an adaptive low-pass filter employing a median filter. FIGS. 18 through 20 each are an explanatory view of an adaptive low-pass filter described in Patent Literature 1.

According to a technique disclosed in Patent Literature 1, a value E1, from a delay circuit 12, of a target pixel to be processed is compared with an output E2 from a three-tap median filter 13 (see FIG. 19), as illustrated in FIG. 18. In a case where the value E1 of the target pixel is larger than the output E2 from the three-tap median filter 13, a noise quantity E3 to be supplied from a noise level detecting circuit 14 is subtracted from the value E1 of the target pixel. In a case where the value E1 of the target pixel is smaller than the output E2 from the three-tap median filter 13, the noise quantity E3 is added to the value E1 of the target pixel. In a case where the value E1 of the target pixel equals to the output E2 from the three-tap median filter 13, the value E1 of the target pixel is outputted as it is.

The noise quantity E3 is detected, by use of the noise level detecting circuit 14, from noise components of a line part having no image signal during a vertical blanking period.

Consequently, a video in which a peak of noise is reduced (see (b) of FIG. 20) is obtained from a video having the noise (see (a) of FIG. 20).

CITATION LIST

Patent Literature

Patent Literature 1
Japanese Patent Application Publication Tokukaihei No. 7-250264 A (Publication Date: Sep. 26, 1995)

SUMMARY OF INVENTION

Technical Problem

FIG. 21 illustrates an original image having discrete noise. FIG. 22 illustrates an image which is processed in a lateral direction of the image once by means disclosed in Patent Literature 1. As is clear from a comparison of the original image illustrated in FIG. 21 with the image illustrated in FIG. 22, a problem occurs such that the image illustrated in FIG. 22 is blurred while noise is reduced from the image illustrated in FIG. 22 by the means disclosed in Patent Literature 1. Further, noise is not completely removed from the image illustrated in FIG. 22 just by a process carried out once in the lateral direction of the image.

In order to further reduce the noise, it is considered that the image illustrated in FIG. 22 is further subjected to a process carried out once in a longitudinal direction thereof in addition to the process carried out once in the lateral direction thereof. FIG. 23 illustrates a result of this case. As is clear from a comparison of the image illustrated in FIG. 22 (an image subjected to the process carried out once in the lateral direction) with an image illustrated in FIG. 23 (an image subjected to the process carried out once in the longitudinal direction and the process carried out once in the lateral direction), a problem newly occurs such that video blur increases while the noise is further reduced as more processes are carried out.

This is because the means disclosed in Patent Literature 1 detects whether or not an image includes noise by comparing two adjacent pixels. Merely a comparison of the two adjacent pixels causes a line in a direction (any one of the longitudinal and lateral directions) in which pixels having a strong correlation are present to be deleted due to a noise reduction process in a case where the direction in which the pixels having a strong correlation are present is orthogonal to a direction in which a pixel to be compared is present, even in a video having a strong correlation in any one of the longitudinal and lateral directions (a y direction and an x direction) (see FIG. 24). This causes reduction in resolution, thereby blurring a video.

The present invention was made in view of the problems, and an object of the present invention is to provide (i) an image processing system which (a) is capable of further reducing noise and (b) is less likely to blur a video, as compared with the means disclosed in Patent Literature 1, and (ii) a display device.

Solution to Problem

In order to attain the object, an image processing system of the present invention is configured to be an image processing system for processing a target pixel to be processed, which target pixel corresponds to inputted image data, a plurality of pixels including the target pixel being arranged in a matrix manner, the image processing system including: a signal processing process circuit for carrying out subtraction or addition, with respect to a pixel value of the target pixel, of a value equivalent to a noise quantity calculated in advance, in a case where the pixel value of the target pixel is larger or smaller, respectively, than a first couple of estimated values for the pixel value of the target pixel, the first couple of estimated values being estimated from pixel values of respective pixels adjacent to the target pixel, centered at the target pixel, in a temporal axis or in a spatial axis.

According to the configuration, it is possible to reduce noise of the target pixel by carrying out subtraction or addition, with respect to the pixel value of the target pixel, of the value equivalent to the noise quantity calculated in advance, in a case where the pixel value of the target pixel is larger or smaller, respectively, than the first couple of estimated values for the pixel value of the target pixel, the first couple of estimated values being estimated from the pixel values of the respective pixels adjacent to the target pixel, in the temporal axis or in the spatial axis passing through the target pixel.

That is, in a case where the pixel value of the target pixel is larger or smaller than the first couple of estimated values for the pixel value of the target pixel, the first couple of estimated values being estimated from the pixel values of the respective pixels adjacent to the target pixel, in the temporal axis or in the spatial axis passing through the target pixel, that is, in a case where the pixel value of the target pixel is not sandwiched between the first couple of estimated values, the signal processing process circuit determines that the target pixel includes noise, and carries out a noise reduction process with respect to the pixel value of the target pixel. In contrast, in a case where the pixel value of the target pixel is sandwiched between the first couple of estimated values, the signal processing process circuit determines that the target pixel does not include noise, and does not carry out the noise reduction process with respect to the pixel value of the target pixel.

Specifically, in a case where the pixel value of the target pixel is larger than the first couple of estimated values for the target pixel (a maximum value), the signal processing process circuit subtracts, from the pixel value of the target pixel, the noise quantity calculated in advance. In contrast, in a case where the pixel value of the target pixel is smaller than the first couple of estimated values for the target pixel (a minimum value), the signal processing process circuit adds, to the pixel value of the target pixel, the noise quantity calculated in advance.

The signal processing process circuit does not carry out a noise reduction process with respect to the pixel value of the target pixel because the signal processing process circuit determines that the target pixel does not include noise in a case where the pixel value of the target pixel is (i) larger than a smaller one of the first couple of estimated values and (ii) smaller than a larger one of the first couple of estimated values.

In the case where the pixel value of the target pixel is thus (i) larger than the smaller one of the first couple of estimated values and (ii) smaller than the larger one of the first couple of estimated values, the pixel value of the target pixel is estimated from pixels having a strong correlation in a temporal axis or in a spatial axis. Therefore, a line along an axis in which the pixels having a strong correlation are present is not subjected to a noise reduction process, and is therefore not deleted.

Therefore, a line in a direction in which pixels having a strong correlation are present is not deleted by a noise reduction process even in a case where the direction in which the pixels having a strong correlation are present is orthogonal to a direction in which a pixel to be compared is present, though conventionally, such a line was deleted in the case. This does not cause reduction in resolution, thereby not blurring a video due to the reduction in resolution.

According to the image processing system of the present invention, it is therefore possible to bring about an effect that noise is further reduced and a video is less likely to blur as compared with the means disclosed in Patent Literature 1.

A display device can display a video which includes less noise, is less blurred, and has a high display quality in a case where the above-described image processing system is applied to an image processing system for use in a display device including a display section for displaying image data processed by an image processing system for processing a target pixel to be processed, which target pixel corresponds to inputted image data, a plurality of pixels including the target pixel being arranged in a matrix manner.

Advantageous Effects of Invention

An image processing system of the present invention is configured to be an image processing system for processing a target pixel to be processed, which target pixel corresponds to inputted image data, a plurality of pixels including the target pixel being arranged in a matrix manner, and is configured to include a signal processing process circuit for carrying out subtraction or addition, with respect to a pixel value of the target pixel, of a value equivalent to a noise quantity calculated in advance, in a case where the pixel value of the target pixel is larger or smaller, respectively, than a first couple of estimated values for the pixel value of the target pixel, the first couple of estimated values being estimated from pixel values of respective pixels adjacent to the target pixel, centered at the target pixel, in a temporal axis or in a spatial axis.

According to the configuration, it is possible to further reduce noise and be less likely to blur a video as compared with the means disclosed in Patent Literature 1.

BRIEF DESCRIPTION OF DRAWINGS

FIG. 4 illustrates a formula representing an algorithm for carrying out a noise quantity detecting method of Embodiment 1.

FIG. 7 illustrates a formula representing an algorithm for carrying out a noise quantity detecting method of Embodiment 2.

DESCRIPTION OF EMBODIMENTS

Figure 1:
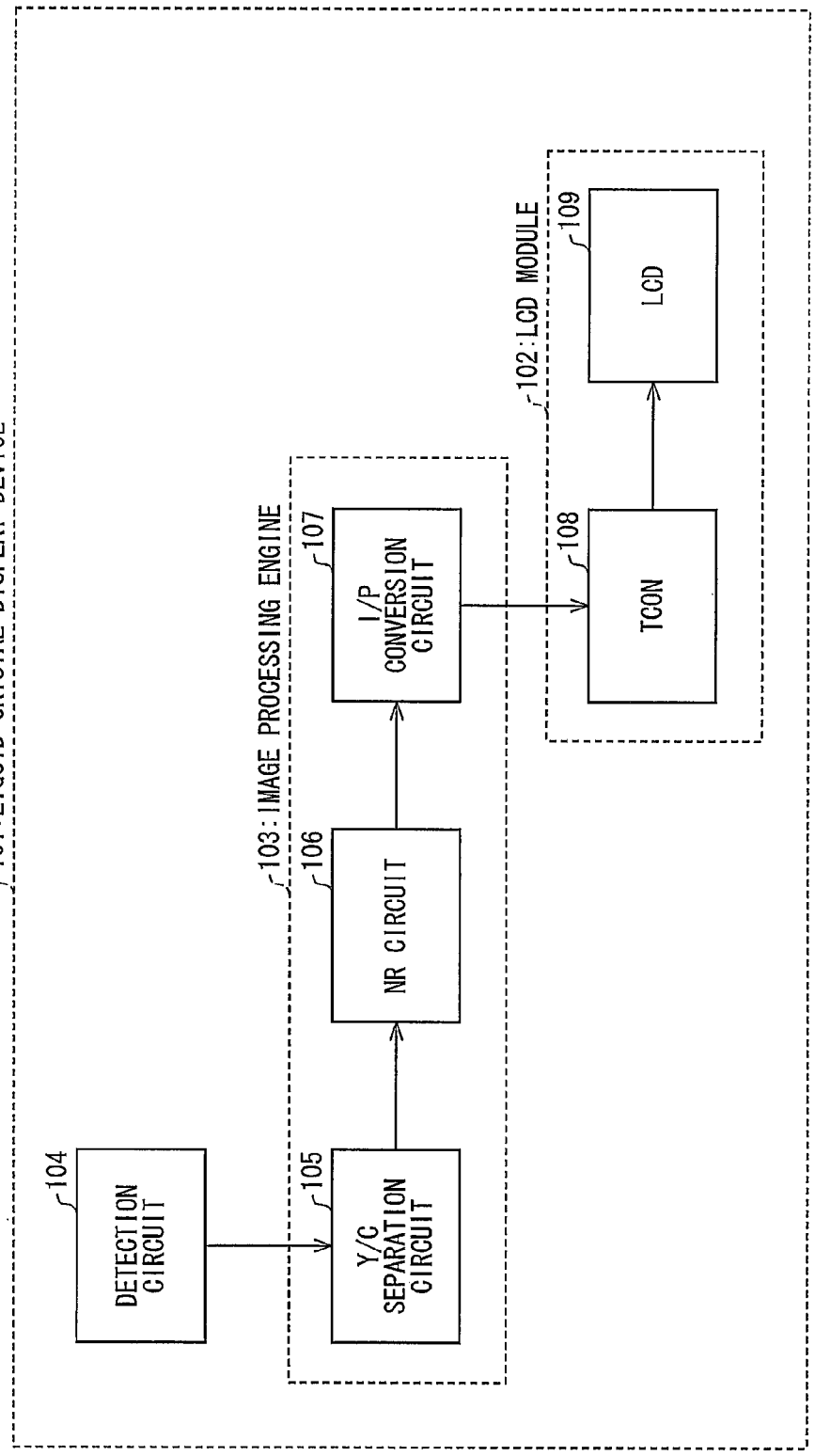
FIG. 1 is a block diagram schematically illustrating a configuration of a liquid crystal display device to which an image processing system in accordance with Embodiment 1 of the present invention is applied.

The following description will discuss Embodiments of the present invention. Note that a principle of the present invention will be described first, and then Embodiments of the present invention will be described.

DESCRIPTION OF PRINCIPLE OF THE PRESENT INVENTION

An image processing system of the present invention employs a correlation between a video and pixels adjacent in a temporal axis or in a spatial axis.

That is, the image processing system of the present invention reduces noise included in a pixel value of a target pixel to be processed (hereinafter referred to as a target pixel), by carrying out subtraction or addition, with respect to the pixel value of the target pixel, of a value equivalent to a noise quantity calculated in advance, in a case where the pixel value of the target pixel is larger or smaller, respectively, than a couple of estimated values for the pixel value of the target pixel, the couple of estimated values being estimated from pixel values of respective pixels adjacent to the target pixel in a temporal axis or in a spatial axis passing through the target pixel.

The image processing system of the present invention employs two signal processing processes (a first signal processing process and a second signal processing process) as a signal processing algorithm for obtaining the couple of estimated values.

The first signal processing process is a signal processing process for, on the basis of a correlation in a spatial axis, providing two axes spatially intersecting with each other, carrying out a filter process in directions of the respective two axes, and calculating, as the couple of estimated values, values that should indicate, in the respective two axes, a location of a target pixel.

The second signal processing process is a signal processing process for, on the basis of a correlation in a temporal axis, carrying out interlace/progressive interpolation in temporally adjacent fields, and calculating, as the couple of estimated values, values that should indicate, in the respective temporally adjacent fields, a location of a target pixel.

The following description will discuss in detail the first signal processing process and the second signal processing process.

(1) First Signal Processing Process

An image frequently has a correlation in any of longitudinal, lateral and oblique directions. It is therefore possible to obtain a couple of estimated values approximate to a value of a location of a target value by calculating values that should indicate the location of the target pixel from respective two axes spatially intersecting with each other.

In a case where a pixel value of the target pixel is much far from the couple of estimated values, the target pixel is regarded as being affected by noise. The noise of the target pixel can be reduced by carrying out subtraction or addition, with respect to the pixel value of the target pixel, of a noise quantity calculated separately.

Meanwhile, a pixel including no noise indicates a value approximate to the couple of estimated values. Therefore, no noise reduction process is carried out with respect to the pixel, and video blur can be prevented.

The following description will discuss a principle obtained in a case where a video has a correlation with pixels adjacent in a spatial axis.

A comparison is made here among (i) a pixel value $A_{ij}$ of a target pixel, (ii) an estimated value $C_{ij}$ for the pixel value $A_{ij}$, and (iii) an estimated value $B_{ij}$ for the pixel value $A_{ij}$. The estimated value $C_{ij}$ is estimated, by use of a low-pass filter, from pixel values of respective pixels, centered at the target pixel, which are aligned in an x direction that is a lateral direction of a display screen on which a video is to be displayed (see FIG. 17). The estimated value $B_{ij}$ is estimated, by use of a low-pass filter, from pixel values of respective pixels, centered at the target pixel, which are aligned in a y direction that is a longitudinal direction of the display screen (see FIG. 17). In a case where the pixel value $A_{ij}$, the estimated value $C_{ij}$, and the estimated value $B_{ij}$ meet the following expressions (I) and (II), it is concluded that the pixel value $A_{ij}$ includes noise, that is, the target pixel includes noise. The noise included in the target pixel is reduced by carrying out subtraction or addition, with respect to the pixel value $A_{ij}$ of the target pixel, of a value equivalent to a noise quantity calculated in advance.

$$A_{ij} > B_{ij}, \text{ and } A_{ij} > C_{ij} \qquad (I)$$

$$A_{ij} < B_{ij}, \text{ and } A_{ij} < C_{ij} \qquad (II)$$

Specifically, in a case where the pixel value $A_{ij}$, the estimated value $C_{ij}$, and the estimated value $B_{ij}$ meet the above expression (I), the pixel value $A_{ij}$ is regarded as including noise having a positive polarity. The value equivalent to the noise quantity calculated in advance is subtracted from the pixel value Aij.

Meanwhile, in a case where the pixel value Aij, the estimated value Cij, and the estimated value Bij meet the above expression (II), the pixel value Aij is regarded as including noise having a negative polarity. The value equivalent to the noise quantity calculated in advance is added to the pixel value Aij.

The value equivalent to the noise quantity calculated in advance is calculated as below.

It is assumed that in a state in which the pixel value Aij, the estimated value Bij, and the estimated value Cij meet the above expressions (I) and (II), differences between the pixel value Aij of the target pixel and an average value of the estimated value Bij and the estimated value Cij are calculated over one (1) field period, and an average value of the differences is the value equivalent to the noise quantity.

The pixel value Aij of the target pixel is thus regarded as including noise in a case where the pixel value Aij of the target pixel is far from each of the estimated value Bij and the estimated value Cij for the location of the target pixel, which are calculated in respective two spatial axes (the x direction and the y direction). Therefore, even a video (see, for example, FIG. 21) having a strong correlation in any one of longitudinal and lateral directions (the x direction and the y direction) is not regarded as including noise because a value, estimated in the direction in which the video has a strong correlation, is to be compared. This consequently makes it possible to prevent reduction in resolution caused by an unnecessary noise process. That is, no video blur occurs that may be caused by a noise process carried out with respect to a target pixel while the video is maintaining a strong correlation.

Meanwhile, a video having no correlation in two spatial axes (in an x direction and a y direction) is regarded as including noise.

Accordingly, the first signal processing process thus makes it possible to reduce noise while preventing video blur.

(2) Second Signal Processing Process

A couple of estimated values approximate to a value that is supposed to indicate a location of a target pixel are calculated by, on the basis of a correlation in a temporal axis, carrying out interlace/progressive interpolation in temporally adjacent fields, and calculating values that should indicate, in the respective temporally adjacent fields, the location of the target pixel.

In a case where a couple of estimated values are thus calculated from pixel values of respective pixels, centered at a target pixel, which are aligned in a temporal axis direction, values having a strong correlation can be obtained for a less moving video. It is therefore possible to detect only noise. Hence, in a case where detected noise is reduced, it is possible to provide a video having neither noise nor blur.

Meanwhile, human eyes are less sensitive to a much moving video. Therefore, even in a case where noise cannot be reduced, the much moving image naturally looks blurred. The noise, which is not noticeable, does not adversely affect the much moving video.

Note here that a noise quantity to be reduced is determined in accordance with a difference between a target pixel and a pixel adjacent to the target pixel in a temporal axis or in a spatial axis. Therefore, a small noise quantity is detected in a video having less noise. This prevents a blur in the video having less noise.

The above description has discussed the principle of the present invention. The following description will discuss Embodiments each employing the principle of the present invention.

Embodiment 1

Embodiment 1 describes a first image processing system of the present invention for carrying out the first signal processing process.

FIG. 1 is a block diagram illustrating an overall arrangement of a liquid crystal display device 101 serving as a display device employing the first image processing system.

The liquid crystal display device 101 at least includes (i) an LCD module 102 for displaying an image, (ii) an image processing engine 103 for supplying a video signal for display to the LCD module 102, and (iii) a detection circuit 104 for detecting a video signal to be supplied to the image processing engine 103 (see FIG. 1). Embodiment 1 assumes a broadcast wave as the video signal. A signaling system of the broadcast wave is an interlace signal of an NTSC signaling system, a PAL signaling system, or the like.

In the liquid crystal display device 101, a video signal broadcasted is detected by the detection circuit 104, and then supplied to an NR (noise reduction) circuit 106 via a Y/C separation circuit 105 of the image processing engine 103. Note that according to Embodiment 1, the signal processing process of the first image processing system of the present invention is applied to the NR circuit 106.

The video signal supplied to the NR circuit 106 is supplied to an I/P conversion circuit 107, by which the video signal is subjected to I/P conversion. Then, the video signal is supplied to the LCD module 102.

The video signal supplied to the LCD module 102 is supplied to an LCD (a liquid crystal panel) 109 via a TCON (a timing controller) 108, and displayed in the LCD 109. The LCD 109 is a display panel (a display section) in which pixels corresponding to inputted image data are arranged in a matrix pattern.

Figure 2:
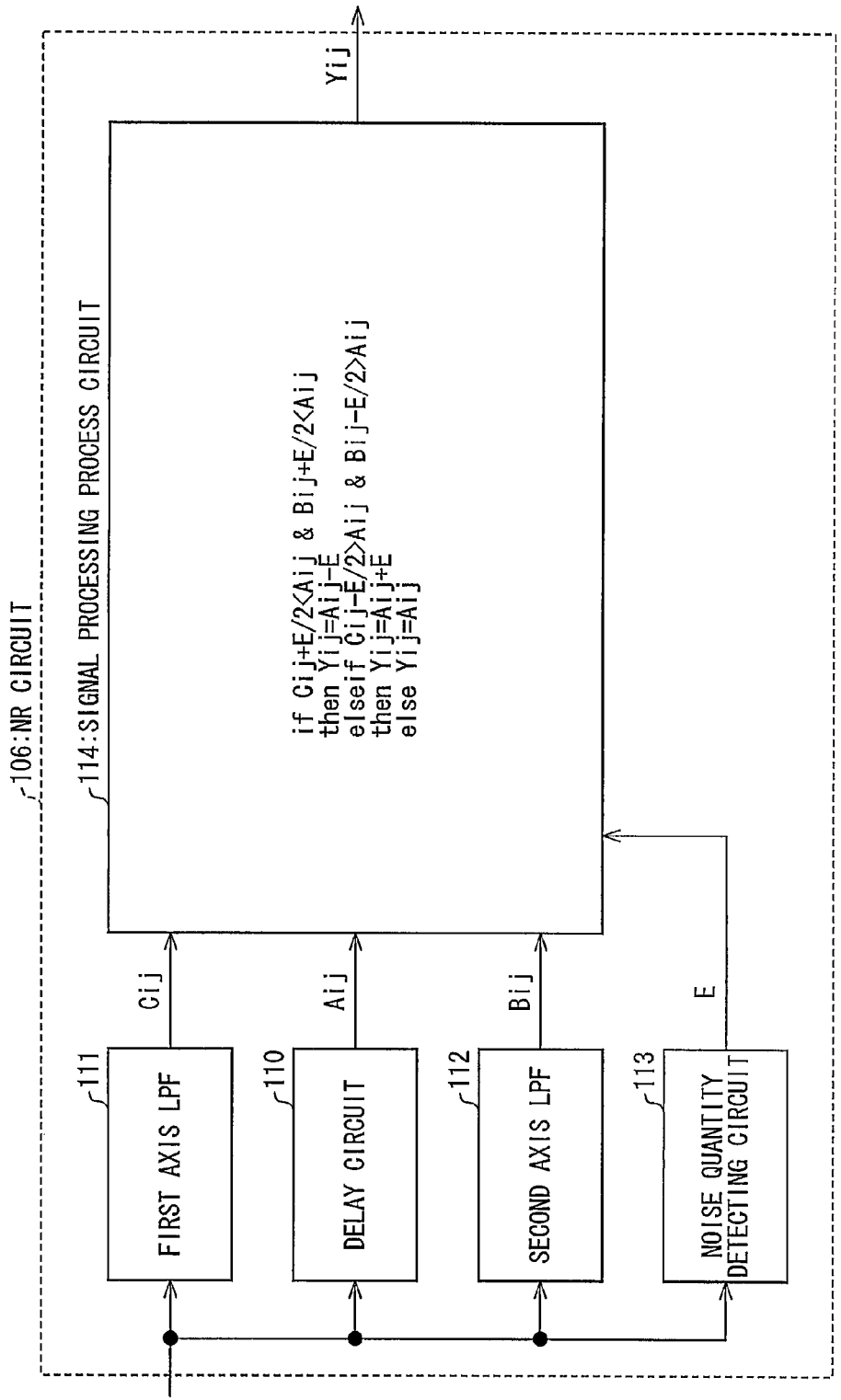
FIG. 2 is a block diagram schematically illustrating a configuration of an NR circuit of an image processing engine provided in the liquid crystal display device illustrated in FIG. 1.

FIG. 2 is a block diagram schematically illustrating a configuration of the NR circuit 106.

The NR circuit 106 includes (i) a delay circuit 110, (ii) a first axis LPF (low-pass filter) 111, (iii) a second axis LPF (low-pass filter) 112, and (iv) a noise quantity detecting circuit 113, to each of which a video signal is supplied from the Y/C separation circuit 105, and (v) a signal processing process circuit 114 for carrying out a noise reduction process in response to signals from the respective circuits (see FIG. 2).

The NR circuit 106 calculates a pixel value Aij of a target pixel subjected to a timing adjustment by the delay circuit 110, and calculates an estimated value Cij and an estimated value Bij of the target pixel by use of the first axis LPF 111 (low-pass filter) and the second axis LPF 112, respectively. The signal processing process circuit 114 makes a comparison of the pixel value Aij, the estimated value Cij, and the estimated value Bij. In a case where the pixel value Aij of the target pixel is a maximum value, the signal processing process circuit 114 subtracts, from the pixel value Aij, a value E equivalent to a noise quantity calculated by the noise quantity detecting circuit 113. Meanwhile, in a case where the pixel value Aij of the target pixel is a minimum value, the signal processing process circuit 114 adds the value E to the pixel value Aij. The signal processing process circuit 114 then outputs, as an output value Yij, a value obtained by carrying out subtraction or addition of the value E with respect to the pixel value Aij. Note that the signal processing process circuit 114 outputs the pixel value Aij as the output value Yij in a case where the signal processing process circuit 114 determines that the pixel value Aij includes no noise.

According to Embodiment 1, the estimated value Cij is calculated, by use of the first axis LPF 111, from pixels arranged in a lateral direction of a spatial axis. Specifically, the estimated value Cij is calculated, by use of an LPF, from pixel values Aij−5 through Aij+5 of respective pixels aligned in the x direction illustrated in FIG. 14.

The LPF is designed to transmit a frequency of approximately 10% through 20% of a sampling frequency of a pixel. Note that a simplest coefficient of the LPF is Aij−2=Aij+2=0.5, and each of the other pixel values is 0 (zero).

The estimated value Bij is calculated, by use of the second axis LPF 112, from pixels arranged in a longitudinal direction of the spatial axis. Specifically, the estimated value Bij is calculated, by use of an LPF, from pixel values Ai−5H through Ai+5H of respective pixels aligned in the y direction illustrated in FIG. 14.

Figure 3:
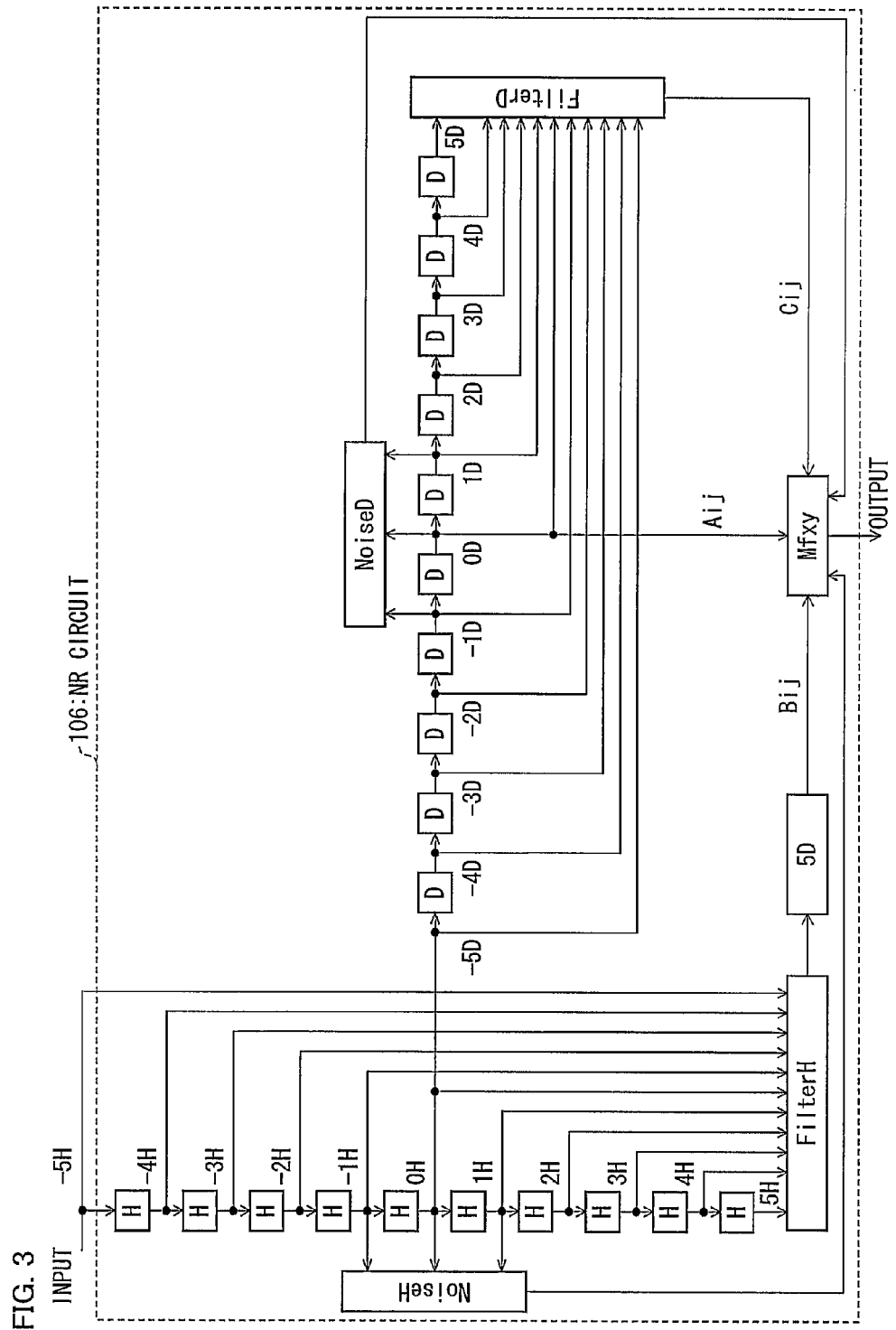
FIG. 3 is a block diagram schematically illustrating a configuration of the NR circuit illustrated in FIG. 2.

According to Embodiment 1, an inputted video signal is an interlace signal. Therefore, what is meant by ±1H illustrated in FIG. 3 is a 1H delay in an interlace signal. A spatial location of the 1H delay becomes ±2$i$ after the interlace signal is subjected to I/P conversion. The LPF is also designed to transmit a frequency of approximately 10% through 20% of a sampling frequency of a pixel provided in a longitudinal direction. It goes without saying that a simplest coefficient of the LPF is Ai−2j=Ai+2j=0.5, and each of the other pixel values is 0 (zero).

Note here that FIG. 3 illustrates a circuit obtained by causing the NR circuit 106 illustrated in FIG. 2 to include line memories H, latch circuits D, a filter Filter H, a filter Filter D, a noise detecting circuit Noise H, a noise detecting circuit Noise D, and a signal processing process circuit Mxf.

In the NR circuit 106 illustrated in FIG. 3, pieces of data of respective pixels aligned in a longitudinal direction are supplied to the filter Filter H via the respective line memories H, and an estimated value Bij of the longitudinal direction is calculated.

Center location data of a group of the line memories H is supplied to the latches D, and pieces of data of respective pixels aligned in a lateral direction are obtained by use of the center location data. The pieces of data thus obtained are supplied to the filter Filter D, and an estimated value Cij of the lateral direction is obtained.

The noise detecting circuit Noise H detects a noise quantity of a y direction from a pixel value of a target pixel, and pixel values of respective pixels adjacent to the target pixel, centered at the target pixel, in the y direction, and supplies the noise quantity of the y direction as a first noise quantity E to the signal processing process circuit Mxf at a subsequent stage.

Meanwhile, the noise detecting circuit Noise D detects a noise quantity of an x direction from the pixel value of the target pixel, and pixel values of respective pixels adjacent to the target pixel, centered at the target pixel, in the x direction, and supplies the noise quantity of the x direction as a second noise quantity E to the signal processing process circuit Mxf at a subsequent stage. The signal processing process circuit Mxf calculates, from the first and second noise quantities E, a noise quantity Er included in the target pixel, and reduces noise of the target pixel by use of the noise quantity Er thus calculated.

That is, a noise reduction process is carried out by use of the noise quantity Er calculated, in a filed (frame) immediately before the target pixel by the signal processing process circuit 114, from the value E equivalent to the noise quantity to be supplied from the noise quantity detecting circuit 113.

Specifically, the signal processing process circuit 114 calculates the noise quantity Er based on the expression (1) illustrated in FIG. 4. Note here that from data of the target pixel and ±1H of the longitudinal direction, differences between the pixel value of the target pixel and an average value of pieces of the data of ±1H of the longitudinal direction are calculated over one field (frame) period in a case where the pixel value of the target pixel is a maximum value or a minimum value. An average value of the differences is assumed as a noise quantity Ery.

Further, differences between the pixel value of the target pixel and an average value of pieces of data of ±1D of the lateral direction are calculated over one field (frame) period in the case where the pixel value of the target pixel is a maximum value or a minimum value. An average value of the differences is assumed as a noise quantity Erx.

A noise quantity Er of a field (frame) subsequent to the one field is calculated from an average value of the noise quantity Ery and the noise quantity Erx.

The signal processing process circuit 114 uses the noise quantity Er thus found, and carries out a noise reduction process with respect to the target pixel as below.

That is, the signal processing process circuit 114 makes a comparison of the pixel value Aij of the target pixel, the estimated value Bij of the longitudinal direction, and the estimated value Cij of the lateral direction, the estimated values Bij and Cij each being calculated in advance. The signal processing process circuit 114 then carries out subtraction or addition, with respect to the pixel value Aij, of the noise quantity Er in a case where the pixel value Aij of the target pixel is a maximum value or a minimum value, respectively. Actually, the signal processing process circuit 114 carries out subtraction or addition, with respect to the pixel value Aij, of the noise quantity Er in a case where the pixel value Aij is larger or smaller, respectively, than the estimated values Bij and Cij by at least a dead zone of ±Er/2 that is set.

Specifically, the noise reduction process is carried out as below.

In a case where the following expression (III) is met, the pixel value Aij is regarded as including noise having a positive polarity, and a value equivalent to the noise quantity Er is subtracted from the pixel value Aij.

$$Aij > Bij + Er/2, \text{ and } Aij > Cij + Er/2 \qquad (III)$$

$$Aij < Bij - Er/2, \text{ and } Aij < Cij - Er/2 \qquad (IV)$$

In a case where the above expression (IV) is met, the pixel value Aij is regarded as including noise having a negative polarity, and the value equivalent to the noise quantity Er is added to the pixel value Aij.

Note that Embodiment 1 uses ±Er/2 as the dead zone. Alternatively, another value such as ±Er/4 can be used as the dead zone.

Figure 5:
FIG. 5 is a view illustrating an image subjected to a noise reduction process by the NR circuit illustrated in FIG. 2.
Figure 21:
FIG. 21 is a view illustrating an original image to be subjected to a noise reduction process.
Figure 22:
FIG. 22 is a view illustrating an image obtained by subjecting the original image illustrated in FIG. 21 to a noise reduction process by use of the adaptive low-pass filter illustrated in FIG. 18.

FIG. 5 illustrates a result obtained when the signal processing algorithm is applied to an original image illustrated in FIG. 21. Note that MATLAB (software developed by Math-Works, Inc.) was used to verify the signal processing algorithm.

Figure 19:
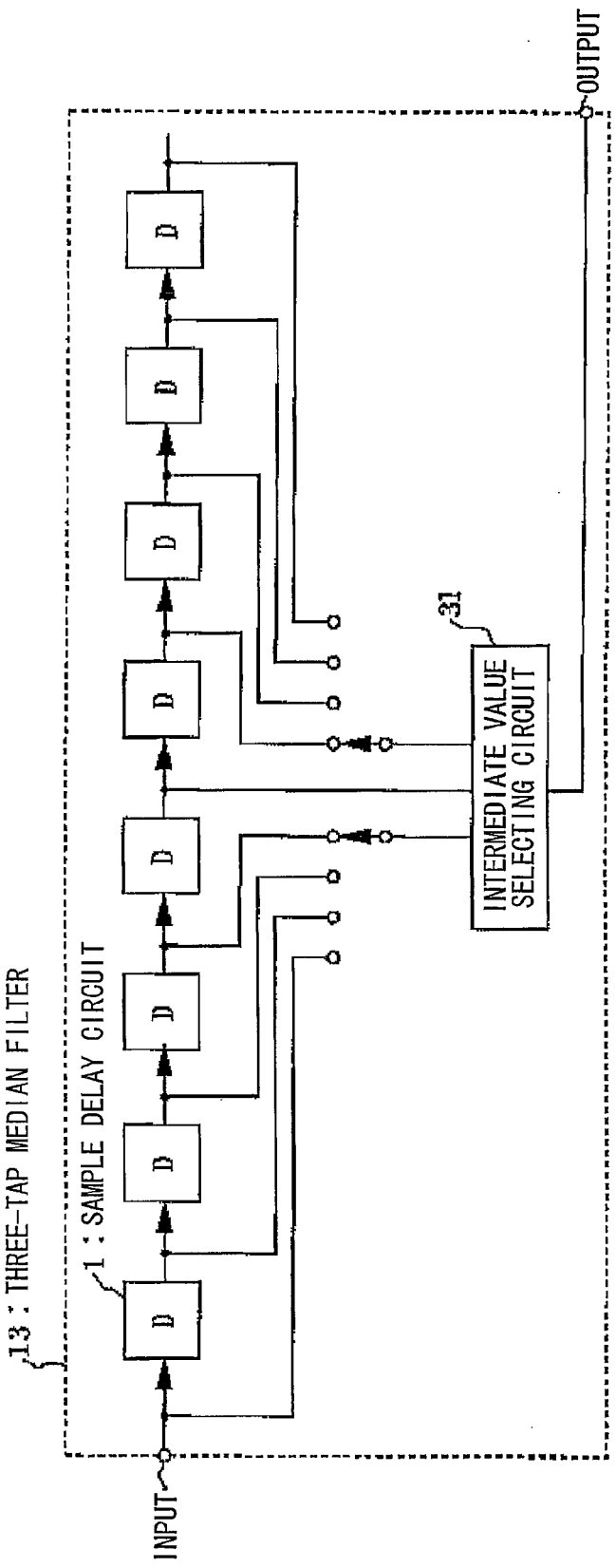
FIG. 19 is an explanatory view of a configuration of a median filter for use in the adaptive low-pass filter illustrated in FIG. 18.
Figure 20:
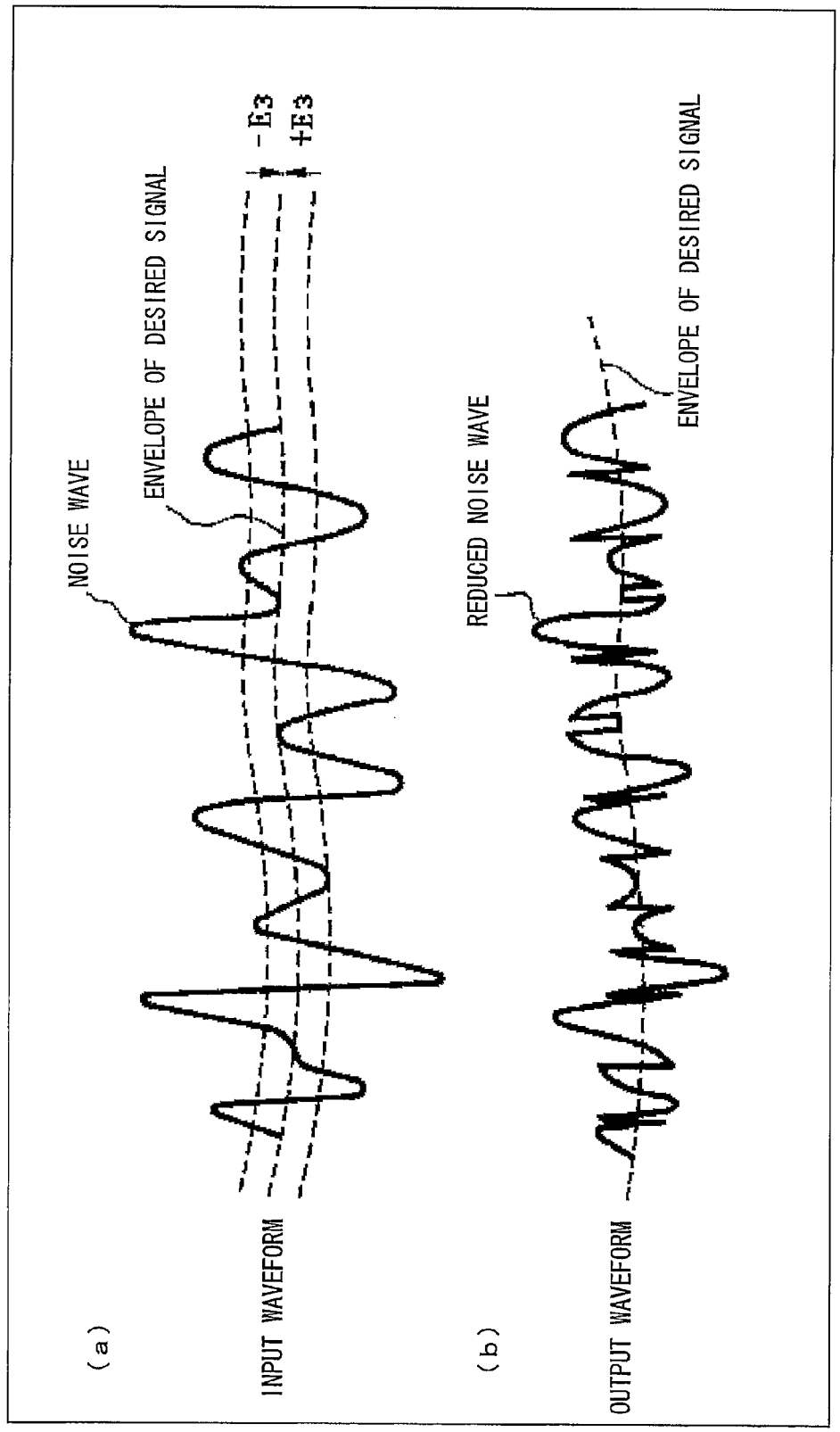
FIG. 20 is an explanatory view theoretically explaining an effect of the adaptive low-pass filter illustrated in FIG. 18.
Figure 23:
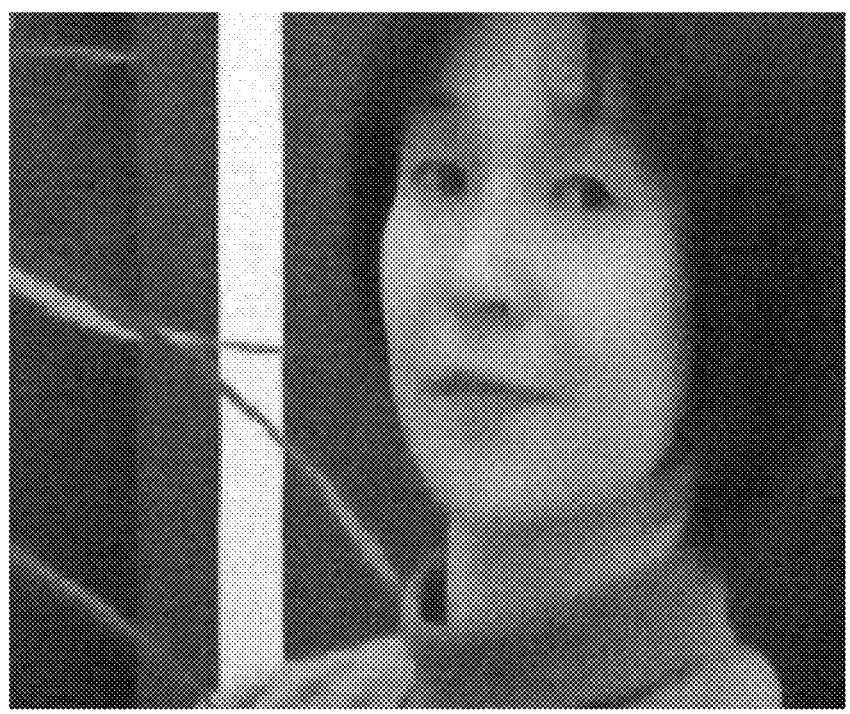
FIG. 23 is a view illustrating another image obtained by subjecting the original image illustrated in FIG. 21 to a noise reduction process by use of the adaptive low-pass filter illustrated in FIG. 18.

It is revealed that an image illustrated in FIG. 5 has less noise than an image which is a conventional example and is illustrated in FIG. 19. It is also revealed that the image illustrated in FIG. 5 has less blur (less shade particularly in cheek and around eyes) than an image illustrated in FIG. 23.

Figure 24:
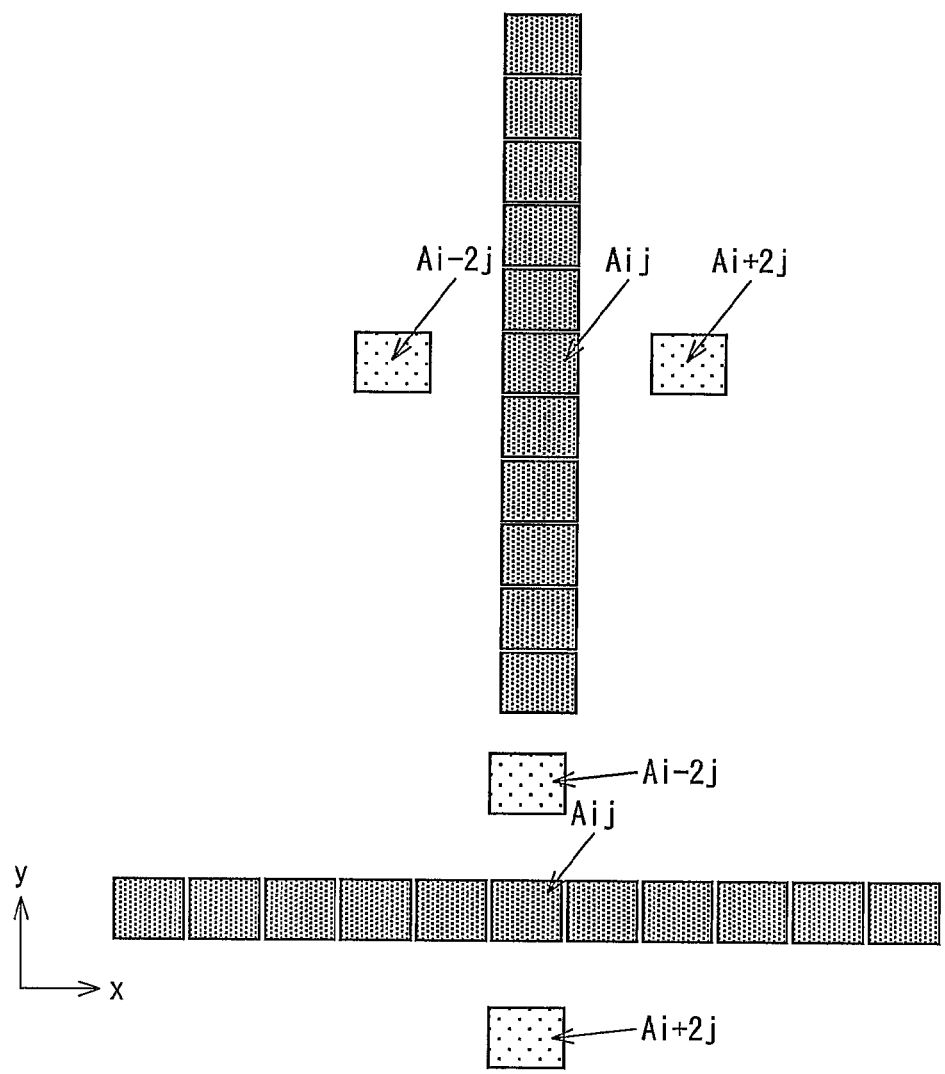
FIG. 24 is an explanatory view of a problem of a conventional adaptive low-pass filter.

According to the image processing system of Embodiment 1, the pixel value Aij of the target pixel is thus regarded as including noise in a case where the pixel value Aij is far from each of the estimated value Bij and the estimated value Cij for the location of the target pixel, which are calculated in the respective two spatial axes (the x direction and the y direction). Therefore, even a video (see, for example, FIG. 24) having a strong correlation in any one of longitudinal and lateral directions (the x direction and the y direction) is not regarded as including noise because a value, estimated in the direction in which the video has a strong correlation, is to be compared. This consequently makes it possible to prevent reduction in resolution caused by an unnecessary noise process. That is, no video blur occurs that may be caused by a noise process carried out with respect to a target pixel while the video is maintaining a strong correlation.

The image processing system of Embodiment 1 thus makes it possible to further reduce noise and further prevent blur as compared with a conventional technique. This allows provision of a video having a high display quality.

Note that the signal processing process circuit 114 can be configured such that, when the pixel value of the target pixel is larger or smaller, respectively, than a couple of estimated values by a given ratio to the noise quantity calculated in advance, the signal processing process circuit 114 carries out subtraction or addition, with respect to the pixel value of the target pixel, of the noise quantity calculated in advance.

According to Embodiment 1, the estimated value for the target pixel is estimated from the pixel values of the respective pixels, centered at the target pixel, which are aligned in the longitudinal direction or in the lateral direction. Note, however, the present invention is not limited to this. The estimated value for the target pixel can be estimated from pixel values of respective pixels, centered at the target pixel, which are aligned in an oblique direction. Embodiment 2 will describe an example in which the estimated value for the target pixel is estimated from the pixel values of the respective pixels, centered at the target pixel, which are aligned in the oblique direction.

Embodiment 2

Embodiment 2 will describe another example of the first image processing system of the present invention.

Figure 17:
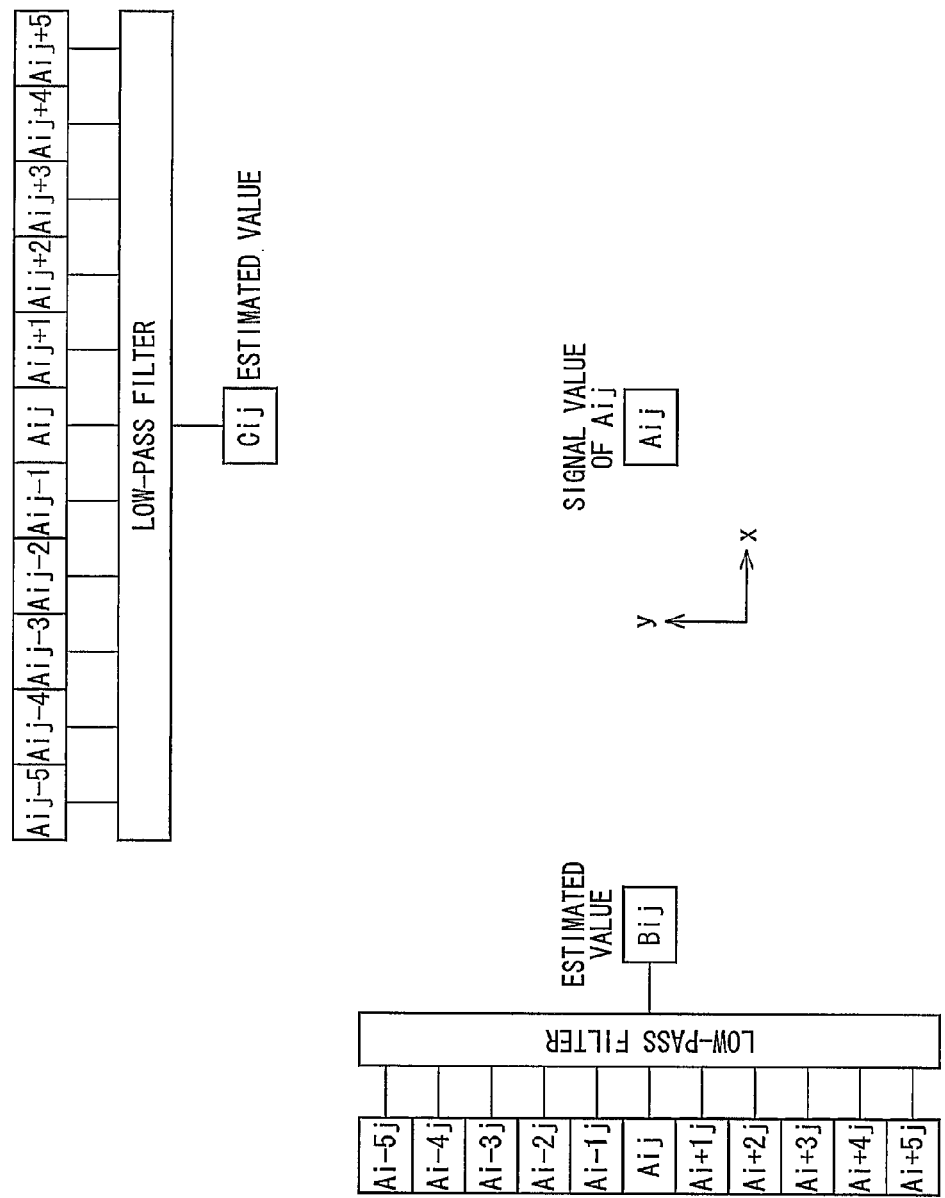
FIG. 17 is an explanatory view of a principle of a noise reduction process of the present invention.
Figure 18:
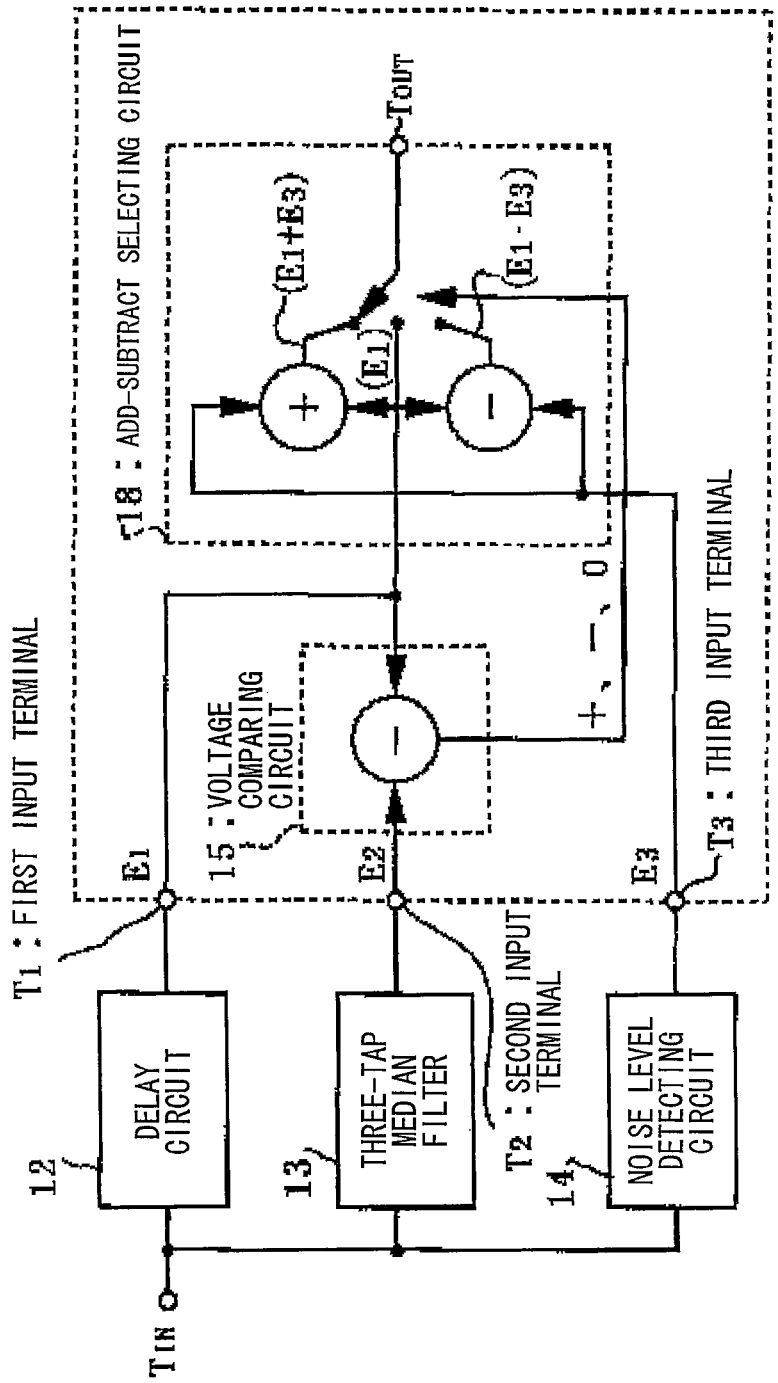
FIG. 18 is a block diagram schematically illustrating a configuration of a conventional adaptive low-pass filter.

Embodiment 1 has described a case where the estimated value Bij and the estimated value Cij are calculated from the respective longitudinal and lateral directions (the x direction and the y direction) each centered at the target pixel (see FIG. 17). Meanwhile, Embodiment 2 will describe an example in which an estimated value Bij and an estimated value Cij are calculated from respective oblique directions each centered at a target pixel (see (a) through (c) of FIG. 6).

Figure 6:
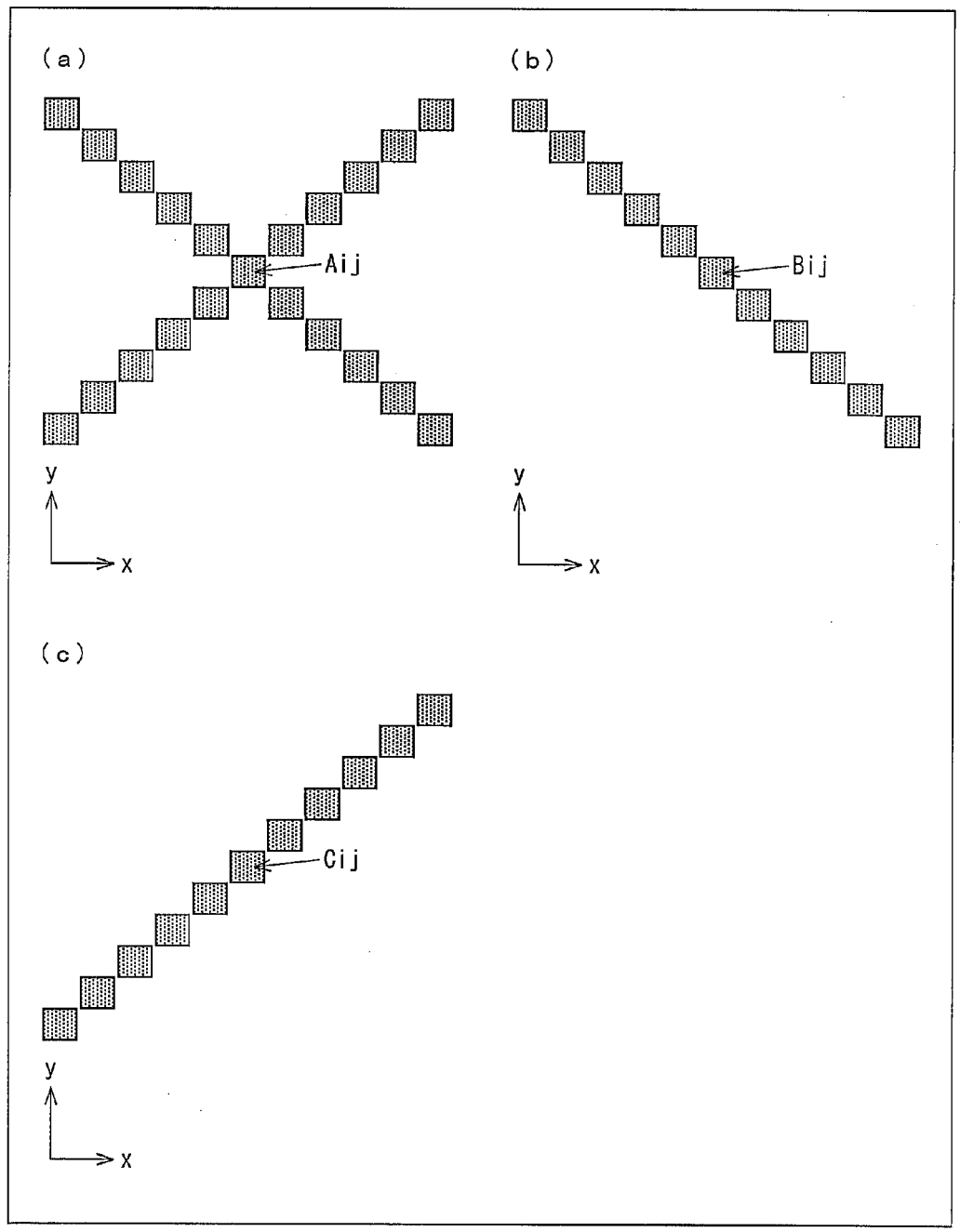
FIG. 6 (a) through (c) of FIG. 6 each are a view exemplifying a spatial axis for use in an image processing engine in accordance with Embodiment 2 of the present invention.

That is, for a pixel value Aij of a target pixel (see (a) of FIG. 6), an estimated value Bij is calculated from pixel values of respective pixels, centered at the target pixel, which are aligned in a straight line represented by x=−ay (a is an arbitrary positive constant) (see (b) of FIG. 6), and an estimated value Cij is calculated from pixel values of respective pixels, centered at the target pixel, which are aligned in a straight line represented by y=bx (b is an arbitrary positive constant) (see (c) of FIG. 6). Note here that the constants a and b used in the above expressions representing the respective straight lines are preferably equal to each other. However, the constants a and b can be different from each other.

Note that a device to which Embodiment 2 is applied is identical to the liquid crystal display device 101 of Embodiment 1. Therefore, a specific description of the device is omitted in Embodiment 2. Further, a process as to whether or not a noise reduction process is carried out in consideration of the pixel value Aij of the target pixel, and the calculated estimated values Bij and Cij is identical to that of Embodiment 1. Therefore, description of the process is also omitted in Embodiment 2.

Note that directions in which noise is detected are the oblique directions (the straight line represented by x=−ay (a is an arbitrary positive constant), and the straight line represented by y=bx (b is an arbitrary positive constant)), as in the case of the directions in which the respective estimated values are estimated. In this case, the signal processing process circuit 114 calculates a noise quantity Er based on the expression (2) illustrated in FIG. 7.

Figure 8:
FIG. 8 is a view illustrating an image subjected to a noise reduction process by use of the spatial axis illustrated in FIG. 6.

A signal processing algorithm of Embodiment 2 estimates an estimated value for a target pixel from pixel values of respective pixels, centered at the target pixel, which are aligned in an oblique direction, and carries out a noise reduction process. FIG. 8 illustrates a result obtained when the signal processing algorithm is applied to the original image illustrated in FIG. 21. An image which has been subjected to the noise reduction process and is illustrated in FIG. 8 seems to be meshed in an oblique direction as compared with the image illustrated in FIG. 5, but seems to have a sufficient noise reducing effect.

Embodiments 1 and 2 have described examples in each of which an estimated value for a target pixel is estimated from pixel values of respective pixels aligned in a spatial axis. However the present invention is not limited to these examples. The estimated value for the target pixel can be estimated from pixel values of respective pixels aligned in a temporal axis. Embodiment 3 will describe below an example in which the estimated value for the target pixel is estimated from the pixel values of the respective pixels aligned in the temporal axis.

Embodiment 3

Embodiment 3 describes a second image processing system of the present invention for carrying out the second signal processing process.

According to Embodiment 3, an estimated value Bij and an estimated value Cij for a pixel value of a target pixel are calculated from adjacent fields, each centered at the target pixel, in a temporal axis, that is, a field immediately before the target pixel and a field immediately after the target pixel, which fields are temporally adjacent fields, each centered at the target pixel.

Normally, a broadcast wave is an interlace signal. Therefore, no data is present at a location of a target pixel in each of a filed immediately before the target pixel and a field immediately after the target pixel (see FIG. 9). This causes a value at the location of the target pixel to be estimated from a video which is two fields (one frame) away. According to Embodiment 3, however, pieces of data of the respective fields immediately before and after the target pixel are used to estimate data of the location of the target, so as to obtain the estimated value Bij and the estimated value Cij.

Figure 9:
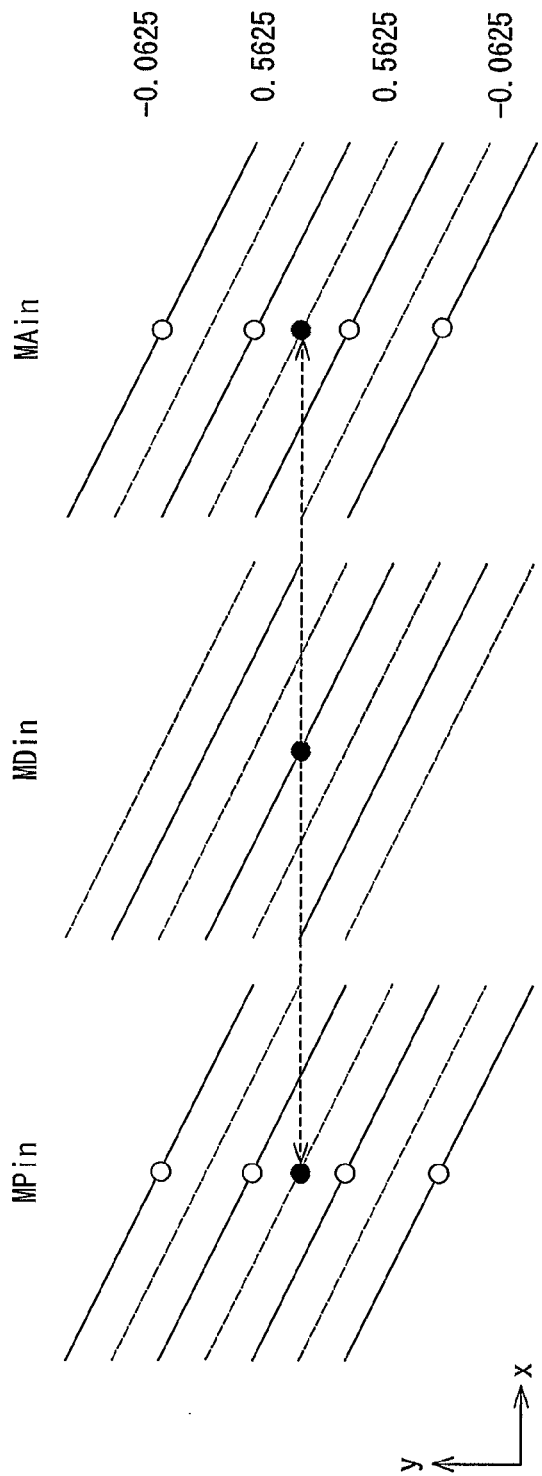
FIG. 9 is a view exemplifying a temporal axis for use in an image processing engine in accordance with Embodiment 3 of the present invention.

According to Embodiment 3, the estimated value Bij and the estimated value Cij are calculated by multiplying values Ai−3j, Ai−2j, Ai−1j, Aij, Ai+1j, Ai+2j, and Ai+3j of respective pixels aligned in a longitudinal direction (in a y direction) by respective values (−0.0625, 0, 0.5625, 0, 0.5625, 0, and −0.0625) (see FIG. 9). Note that it goes without saying that simplest estimated values are calculated by multiplying the values of the respective pixels by respective values (0, 0, 0.5, 0, 0.5, 0, and 0).

Figure 10:
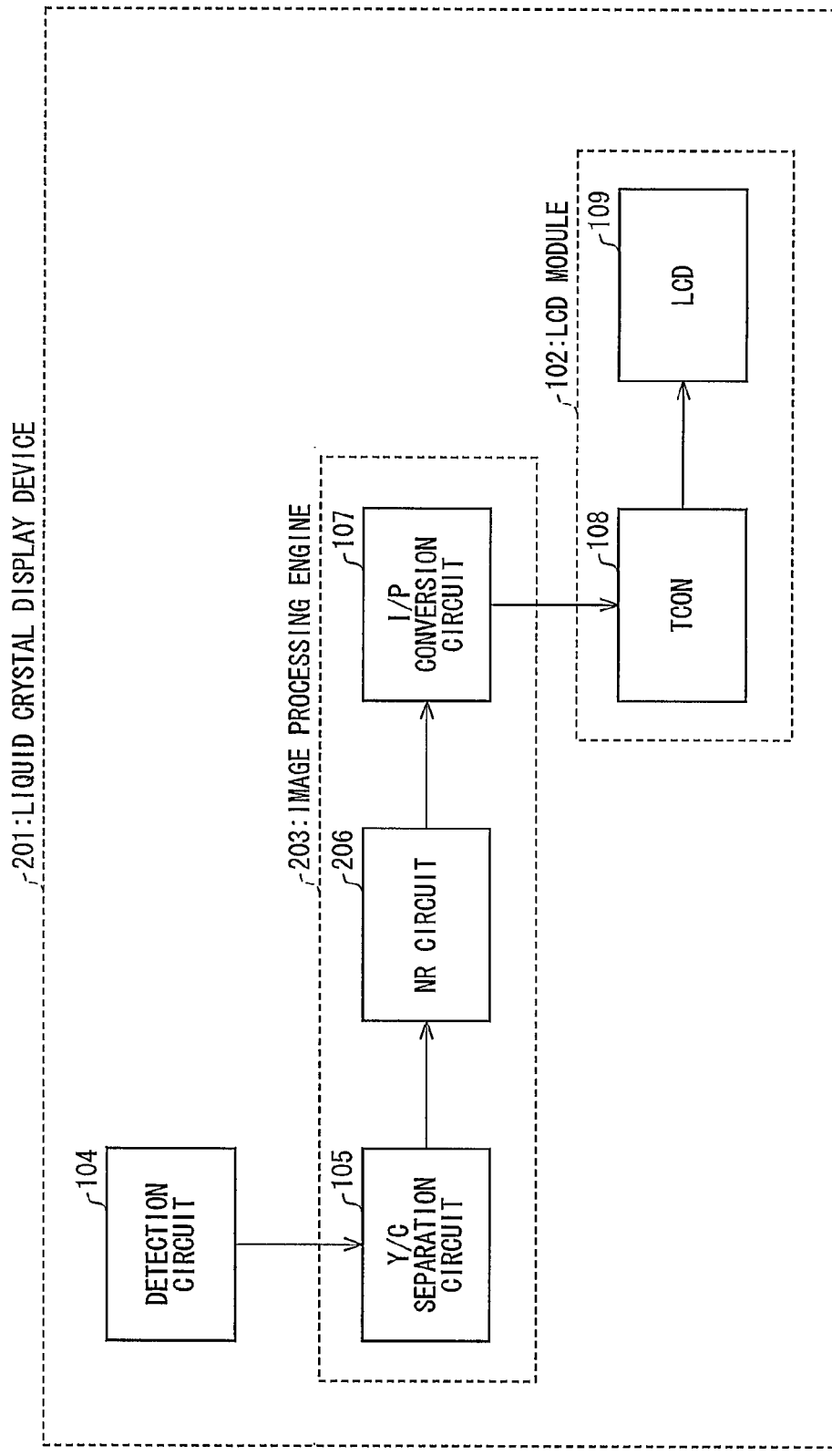
FIG. 10 is a block diagram schematically illustrating a configuration of a liquid crystal display device to which an image processing system in accordance with Embodiment 3 of the present invention is applied.

FIG. 10 is a block diagram illustrating an overall arrangement of a liquid crystal display device 201 serving as a display device to which the second image processing system is applied. Members having functions identical to those of the liquid crystal display device 101 of Embodiment 1 (see FIG. 1) are given respective identical reference numerals, and a description of those members is omitted here.

The liquid crystal display device 201 includes an image processing engine 203 with which the image processing engine 103 of the liquid crystal display device 101 illustrated in FIG. 1 has been replaced (see FIG. 10). The image processing engine 203 includes an NR circuit 206 with which the NR circuit 106 of the image processing engine 103 illustrated in FIG. 1 has been replaced.

Figure 11:
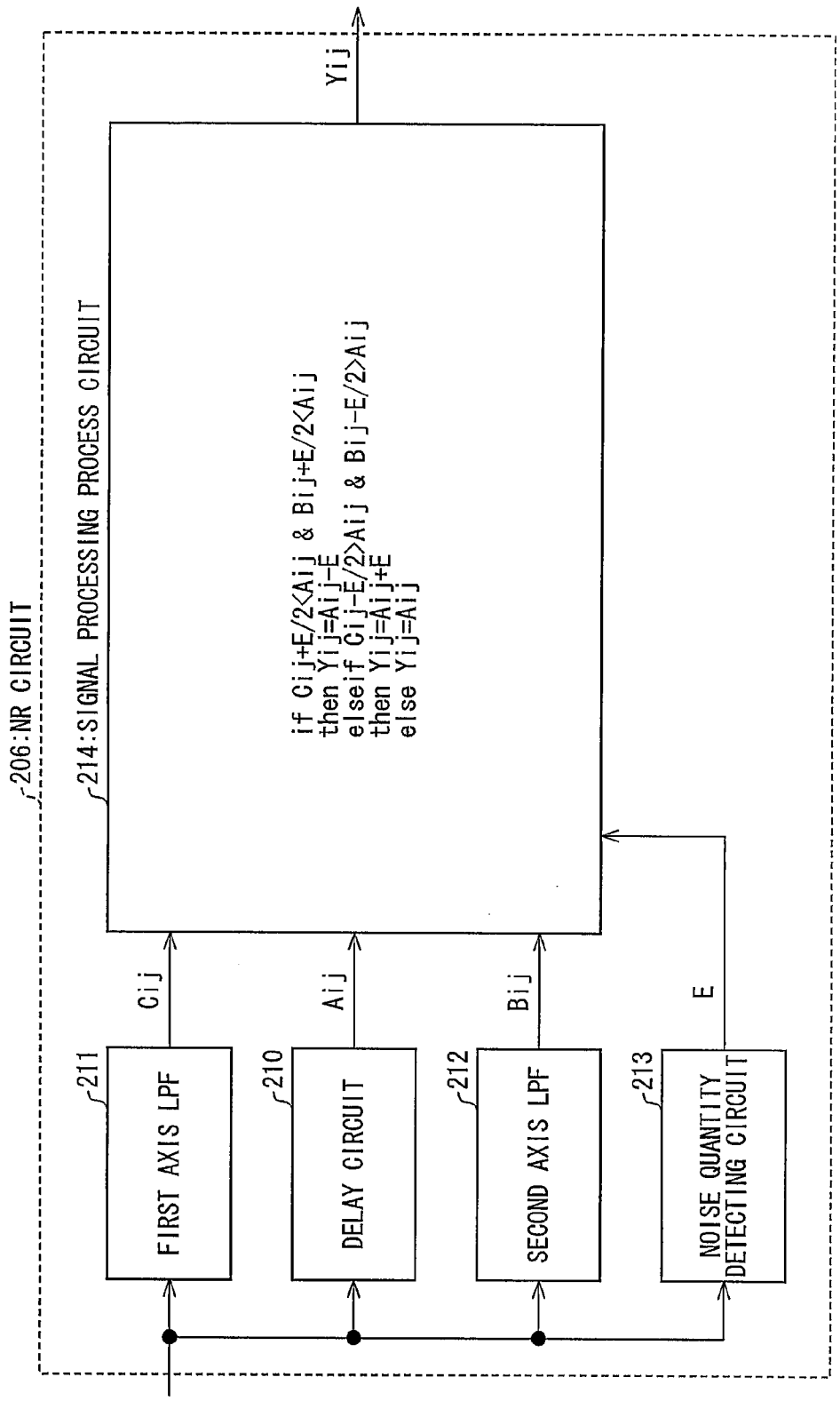
FIG. 11 is a block diagram schematically illustrating a configuration of an NR circuit of an image processing engine provided in the liquid crystal display device illustrated in FIG. 10.

FIG. 11 is a block diagram schematically illustrating a configuration of the NR circuit 206.

The NR circuit 206 includes (i) a delay circuit 210, (ii) a first axis LPF (low-pass filter) 211, (iii) a second axis LPF (low-pass filter) 212, and (iv) a noise quantity detecting circuit 213, to each of which a video signal is supplied from a Y/C separation circuit 105, and (v) a signal processing process circuit 214 for carrying out a noise reduction process in response to signals from the respective circuits (see FIG. 11).

The NR circuit 206 is basically identical in configuration to the NR circuit 106 of Embodiment 1 (see FIG. 2), whereas the NR circuit 206 is different in function from the NR circuit 106. The NR circuit 206 carries out the second signal processing process. Specifically, the NR circuit 206 is configured as illustrated in a block diagram of FIG. 12.

Figure 12:
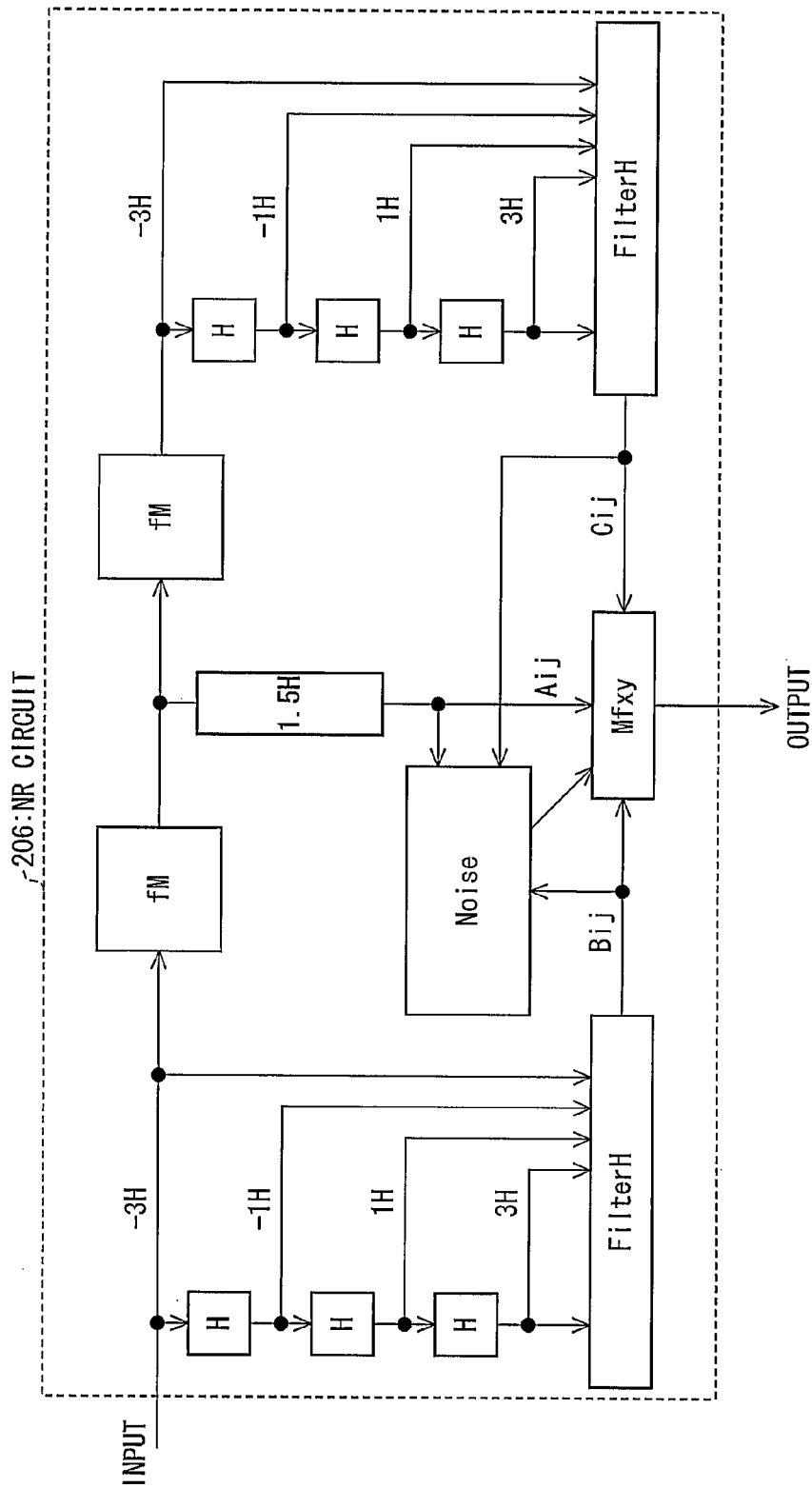
FIG. 12 is a block diagram schematically illustrating a configuration of an NR circuit employing the temporal axis illustrated in FIG. 9.

According to the NR circuit 206 illustrated in FIG. 12, pixel values of respective pixels aligned in a longitudinal direction (in a y direction) are obtained through first line memories H, and an estimated value Bij is obtained from a first filter Filter H. A pixel value Aij of a target pixel is obtained by use of a first field memory fM and a line memory 1.5H. Pixel values of respective pixels aligned in a longitudinal direction (in a y direction) are obtained through a second field memory fM and second line memories H, and an estimated value Cij is obtained from a second filter Filter H.

As in the case of the signal processing process circuit 114 of Embodiment 1, a signal processing process circuit Mfxy determines, in accordance with the pixel value Aij of the target pixel inputted, the estimated value Bij, and the estimated value Cij, whether or not to carry out a noise process with respect to the target pixel. In a case where the signal processing process circuit Mfxy determines that it is necessary to carry out the noise process, the signal processing process circuit Mfxy carries out subtraction or addition, with respect to the pixel value Aij, of a noise quantity calculated by a noise quantity detecting circuit Noise.

Figures 13, 14:
FIG. 13 illustrates a formula representing an algorithm for carrying out a noise quantity detecting method of Embodiment 3.
FIG. 14 is a view illustrating an image subjected to a noise reduction process by use of the temporal axis illustrated in FIG. 9.

The noise quantity detecting circuit Noise calculates a noise quantity based on the expression (3) illustrated in FIG. 13. That is, the noise quantity detecting circuit Noise uses a pixel value Aij (MDin) of a target pixel and estimated values Bij (Mpin) and Cij (Main) to calculate, over one (1) field, an average of differences between the pixel value Aij (MDin) and the estimated values (Bij+Cij)/2 in a case where the pixel value Aij is a maximum value or a minimum value.

Others of Embodiment 3 are identical to those of Embodiment 1. Therefore, detailed description for the others is omitted here.

A signal processing algorithm of Embodiment 3 estimates estimated values for a target pixel from pixel values of respective pixels, centered at the target pixel, which are aligned in a temporal axis direction, and carries out a noise reduction process. FIG. 14 illustrates a result obtained when the signal processing algorithm is applied to the original image illustrated in FIG. 21. An image illustrated in FIG. 14 has less blur than the image illustrated in FIG. 5. The image illustrated in FIG. 14, however, slightly includes noise. In view of this, a liquid crystal display device 301 (see FIG. 15) is arranged such that an image processing engine 303 includes the NR circuit 206 (see FIG. 10) and the NR circuit 106 (see FIG. 1) which are connected in series in this order. Therefore, according to the image processing engine 303, in a case where the NR circuit 106 further carries out the signal processing algorithm of Embodiment 1 with respect to the image (see FIG. 14) which has been subjected to the image processing algorithm of Embodiment 2 by the NR circuit 206, an image illustrated in FIG. 16 is obtained.

Figure 16:
FIG. 16 is a view illustrating an image subjected to a noise reduction process by use of the spatial axis illustrated in FIG. 6 and the temporal axis illustrated in FIG. 9.

It is shown that the image illustrated in FIG. 16 has further less noise while being slightly more blurred than the image illustrated in FIG. 5.

As described earlier, in a case where an image is subjected to a noise reduction process by use of the signal processing algorithm of the second image processing system described in Embodiment 3 of the present invention and then the image is further subjected to a noise reduction process by use of the signal processing algorithm of the first image processing system described in Embodiment 1 of the present invention, a processed image is obtained which is slightly blurred but includes less noise.

Figure 15:
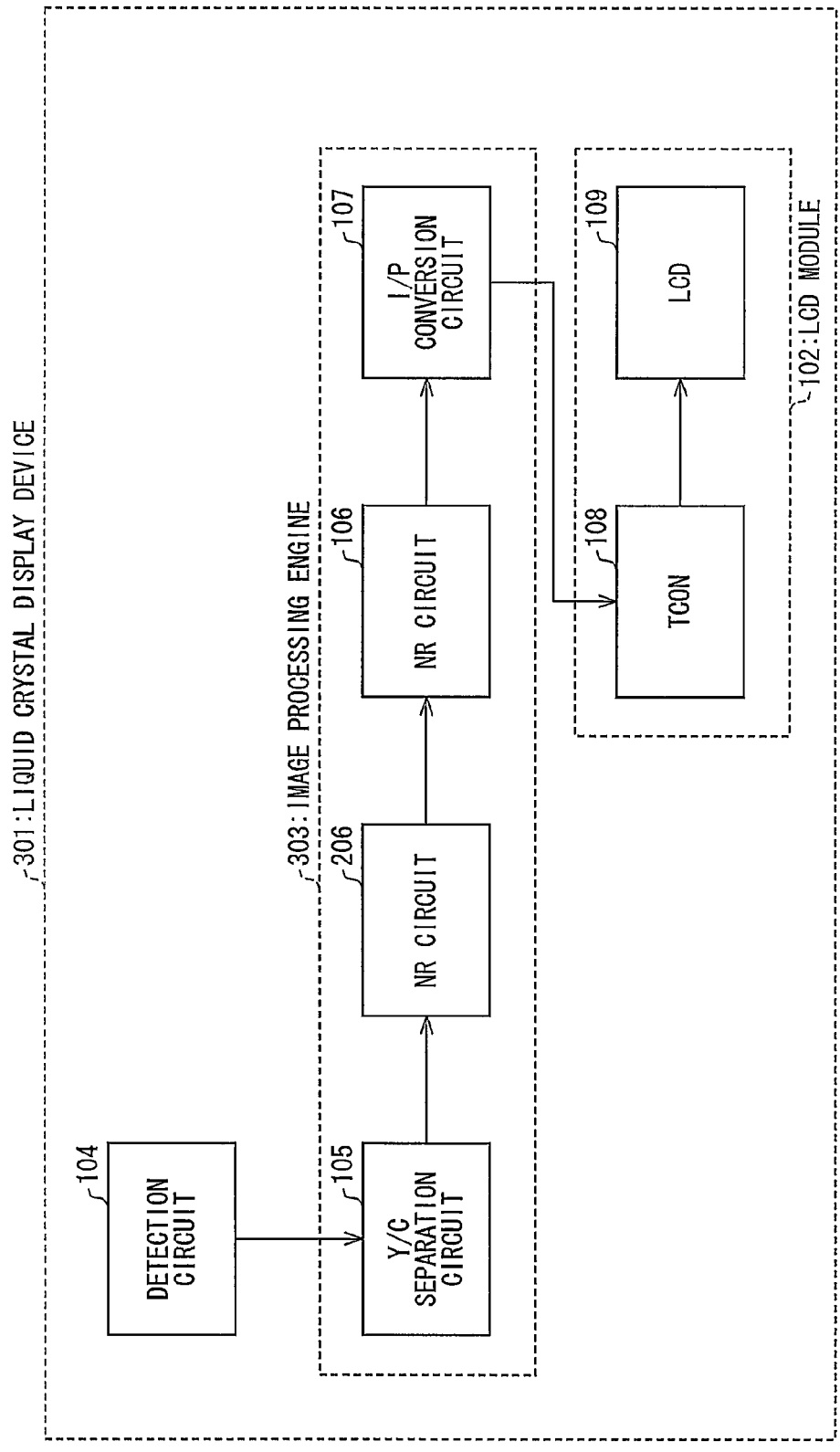
FIG. 15 is a block diagram schematically illustrating another configuration example of a liquid crystal display device to which an image processing system in accordance with Embodiment 3 of the present invention is applied.

That is, the image processing engine 303 of the liquid crystal display device 301 illustrated in FIG. 15 is arranged as below. The image processing engine 303 calculates a first couple of estimated values for a pixel value of a target pixel from pixel values of respective pixels adjacent to the target pixel, centered at the target pixel, in a temporal axis. Subsequently, the image processing engine 303 carries out a signal process with respect to the pixel value of the target pixel by use of the first couple of estimated values. Thereafter, the image processing engine 303 calculates a second couple of estimated values for the pixel value of the target pixel from pixel values of respective pixels adjacent to the target pixel, centered at the target pixel, in different two spatial axes. Then, the image processing engine 303 carries out a signal process with respect to the pixel value of the target pixel by use of the second couple of estimated values.

As described earlier, in a case where a pixel value of a target pixel is subjected to a noise reduction process by use of estimated values calculated from a temporal axis and the pixel value of the target pixel is further subjected to a noise reduction process by use of estimated values calculated from spatial axes, it is possible to yield an effect of providing an image which is less blurred, includes no noise, and has a high display quality.

The signal processing process circuit can be configured to find the first couple of estimated values for the pixel value of the target pixel, from pixel values of respective pixels adjacent to the target pixel, centered at the target pixel, in different two spatial axes.

According to the configuration, the first couple of estimated values for the pixel value of the target pixel are calculated from the pixel values of the respective pixels adjacent to the target pixel, in the different two spatial axes, and whether or not a noise process should be carried out is determined. Therefore, a pixel having a strong correlation with an adjacent pixel, which pixel may be failed to notice in a case where one estimated value is calculated from one spatial axis, is not subjected to a noise process. It is therefore possible to provide a video having a high display quality and no blur, which video is properly subjected to a noise reduction process.

The signal processing process circuit can be configured to find the first couple of estimated values for the pixel value of the target pixel, from the pixel values of the respective pixels adjacent to the target pixel, centered at the target pixel, in the temporal axis.

According to the configuration, the first couple of estimated values for the pixel value of the target pixel are calculated from the pixel values of the respective pixels adjacent to the target pixel in the temporal axis, and whether or not a noise process should be carried out is determined. Therefore, pixels having a strong correlation in a temporal axis are not subjected to a noise process. It is consequently possible to provide a video having a high display quality and no blur, which video is properly subjected to a noise reduction process.

The signal processing process circuit can be configured to estimate the noise quantity by (i) comparing the pixel value of the target pixel with pixel values of respective two pixels each adjacent to the target pixel, centered at the target pixel, in the temporal axis or in the spatial axis and (ii) averaging a difference between the pixel value of the target pixel and an average value of the pixel values of the two pixels each adjacent to the target pixel, when the pixel value of the target pixel is a maximum value or a minimum value.

According to the configuration, a noise quantity included in a target pixel can be reliably estimated. Therefore, a noise process can be properly carried out.

The signal processing process circuit can be configured to carry out subtraction or addition, with respect to the pixel value of the target pixel, of the noise quantity calculated in advance, when the pixel value of the target pixel is larger or smaller, respectively, than the first couple of estimated values by a certain ratio of the noise quantity calculated in advance.

The signal processing process circuit can be configured to (i) find the first couple of estimated values for the pixel value of the target pixel, from the pixel values of the respective pixels adjacent to the target pixel, centered at the target pixel, in the temporal axis, (ii) carry out signal processing with respect to the pixel value of the target pixel by use of the first couple of estimated values, (iii) further find, from pixel values of respective pixels adjacent to the target pixel in different two spatial axes each centered at the target pixel, a second couple of estimated values for the pixel value of the target pixel, and (iv) further carry out signal processing with respect to the pixel value of the target pixel by use of the second couple of estimated values.

According to the configuration, an image processed by use of first estimated values calculated from a temporal axis slightly has noise while blur of the image is reduced. According to the configuration, however, the image processed by use of the first estimated values is further processed by use of second estimated values calculated from a spatial axis. It is therefore possible to obtain an image whose blur and noise are reduced.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is applicable to a device for processing an image signal and/or an audio signal. The present invention is suitably applicable particularly to, for example, a display device for displaying a static image and/or a moving image.

REFERENCE SIGNS LIST

101: liquid crystal display device
102: LCD module
103: image processing engine
104: detection circuit
105: Y/C separation circuit
106: NR circuit
107: I/P conversion circuit
108: TCON (timing controller)
109: LCD (liquid crystal panel)
201: liquid crystal display device
203: image processing engine
206: NR circuit
301: liquid crystal display device
303: image processing engine
D: latch circuit
Noise H, Noise D, and Noise: noise quantity detecting circuit
H: memory circuit
Filter H, and Filter D: filter circuit
Mfxy: signal processing process circuit
fM: field memory

The invention claimed is:

1. An image processing system arranged to process a target pixel to be processed, which target pixel corresponds to inputted image data, a plurality of pixels including the target pixel being arranged in a matrix manner,
the image processing system comprising:
a signal processing process circuit arranged to carry out subtraction or addition, with respect to a pixel value of the target pixel, of a value equivalent to a noise quantity calculated in advance, in a case where the pixel value of the target pixel is larger or smaller, respectively, than a first estimated value and a second estimated value of the pixel value of the target pixel, the first estimated value and the second estimated value being different values which are estimated from pixel values of respective pixels adjacent to and centered on the target pixel in a temporal arrangement and/or a spatial arrangement.

2. The image processing system as set forth in claim 1 wherein:
the signal processing process circuit finds the first estimated value and the second estimated value of the pixel value of the target pixel, from the pixel values of the respective pixels adjacent to the target pixel, the respective pixels adjacent to the target pixel are centered at the target pixel and arranged in two different spatial axes.

3. The image processing system as set forth in claim 1 wherein:
the signal processing process circuit finds the first estimated value and the second estimated value of the pixel value of the target pixel, from the pixel values of the respective pixels adjacent to the target pixel, the respective pixels adjacent to the target pixel are centered at the target pixel and arranged in spatial axes of anteroposterior time frames.

4. The image processing system as set forth in claim 1 wherein:
the signal processing process circuit estimates the noise quantity by (i) comparing the pixel value of the target pixel with pixel values of respective two pixels each adjacent to the target pixel and centered at the target pixel in the temporal arrangement and/or the spatial arrangement and (ii) averaging a difference between the pixel value of the target pixel and an average value of the pixel values of the two pixels each adjacent to the target pixel, when the pixel value of the target pixel is a maximum value or a minimum value.

5. The image processing system as set forth in claim 1 wherein:

the signal processing process circuit carries out subtraction or addition, with respect to the pixel value of the target pixel, of the noise quantity calculated in advance, when the pixel value of the target pixel is larger or smaller, respectively, than the first estimated value and the second estimated values by a certain ratio of the noise quantity calculated in advance.

6. The image processing system as set forth in claim 1 wherein:

the signal processing process circuit (i) finds the first estimated value and the second estimated value of the pixel value of the target pixel, from the pixel values of the respective pixels adjacent to the target pixel, the respective pixels adjacent to the target pixel are centered at the target pixel and arranged in spatial axes of anteroposterior time frames, (ii) carries out signal processing with respect to the pixel value of the target pixel by use of the first estimated value and the second estimated values, (iii) further finds, from the pixel values of the respective pixels adjacent to the target pixel, the respective pixels adjacent to the target pixel are centered at the target pixel and arranged in two different spatial axes, a third estimated value and a fourth estimated value of the pixel value of the target pixel, and (iv) further carries out signal processing with respect to the pixel value of the target pixel by use of the third estimated value and the fourth estimated values.

7. A display device, comprising a display section arranged to display image data processed by an image processing system recited in claim 1.

* * * * *